(No Model.) 2 Sheets—Sheet 1.

W. N. CANDEE.
APPARATUS FOR PRESERVING EGGS.

No. 360,202. Patented Mar. 29, 1887.

Attest:
Sidney P. Hollingsworth
Walter S. Dodge.

Inventor.
William N. Candee,
by Dodge & Son,
his Attys.

(No Model.) 2 Sheets—Sheet 2.

W. N. CANDEE.
APPARATUS FOR PRESERVING EGGS.

No. 360,202. Patented Mar. 29, 1887.

on line x-x

Attest.
Sidney P. Hollingsworth
Walter S. Dodge

Inventor
William N. Candee,
by Dodge & Son,
his Attys.

UNITED STATES PATENT OFFICE.

WILLIAM N. CANDEE, OF BUFFALO, NEW YORK.

APPARATUS FOR PRESERVING EGGS.

SPECIFICATION forming part of Letters Patent No. 360,202, dated March 29, 1887.

Application filed December 7, 1886. Serial No. 220,923. (No model.)

*To all whom it may concern:*

Be it known that I, WILLIAM N. CANDEE, of Buffalo, in the county of Erie and State of New York, have invented certain new and useful Improvements in Egg-Preservers, of which the following is a specification.

My invention relates to the preservation of eggs; and it consists in a novel construction and arrangement of egg-holding trays, as hereinafter more fully set forth and claimed, whereby each individual egg is caused to reverse its position, end for end, at stated times.

It is well known that eggs may be preserved quite a long period if the position of the egg be reversed occasionally, in order that the yelk may be prevented from adhering to the shell; and it is also a matter of common knowledge that the eggs if placed upon end with their longest axis vertical will keep much longer than when placed upon their sides with their longest axis horizontal; hence it has long been common to turn the eggs over end for end by hand, or to invert the receptacle containing them. Various devices have been devised to carry out these ideas; but in no case, so far as I am aware, has anyone ever before constructed an egg-tray so as to hold the eggs in an upright position with their longest axis vertical and allow them each to tumble or roll over and reverse their position, end for end, without reversal of the tray. By this plan I am enabled to preserve the eggs for an almost indefinite period and to produce an egg-preserver that is simple and cheap in construction and efficient in operation.

Figure 1:
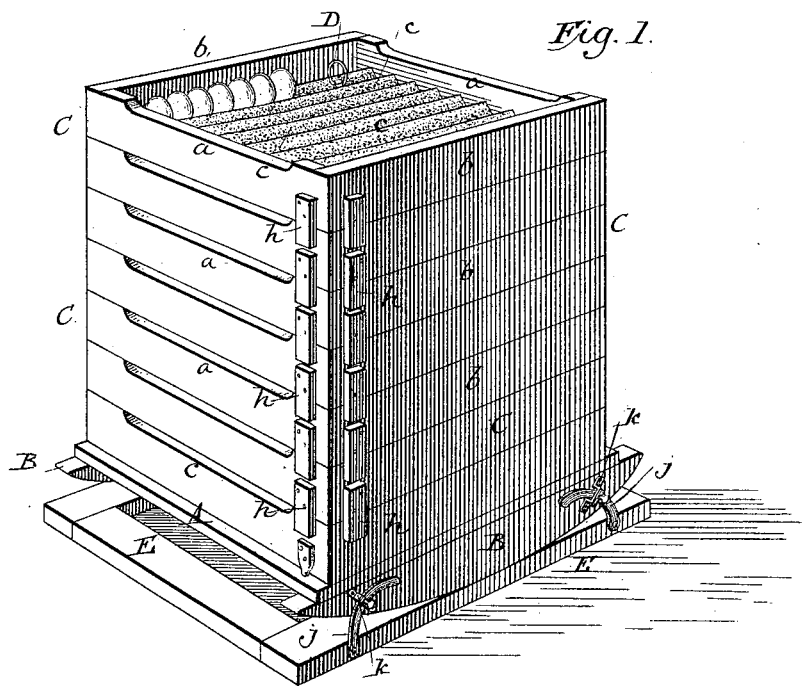
Figure 2:
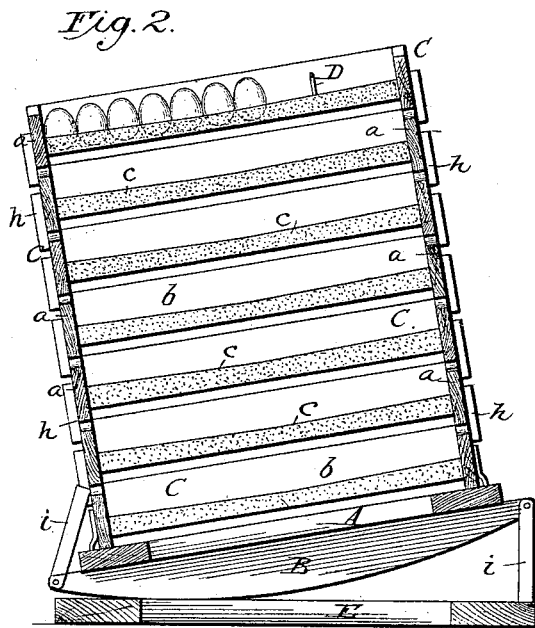
Figure 3:
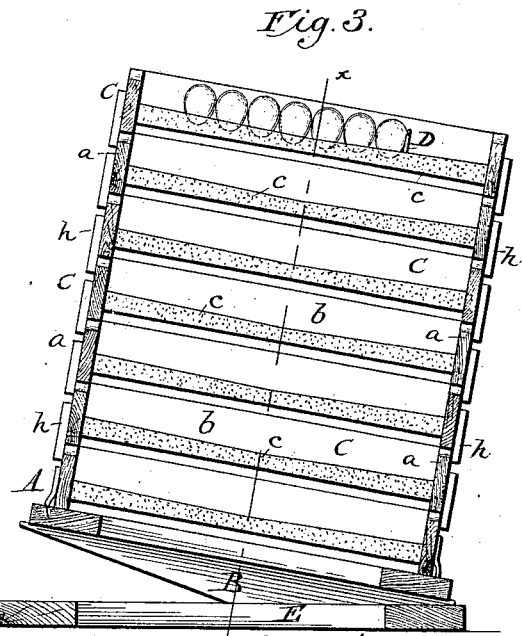
Figure 4:
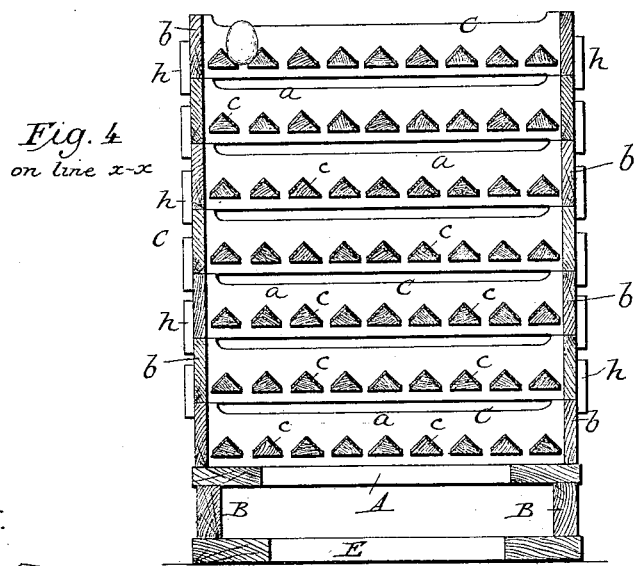
Figure 5:
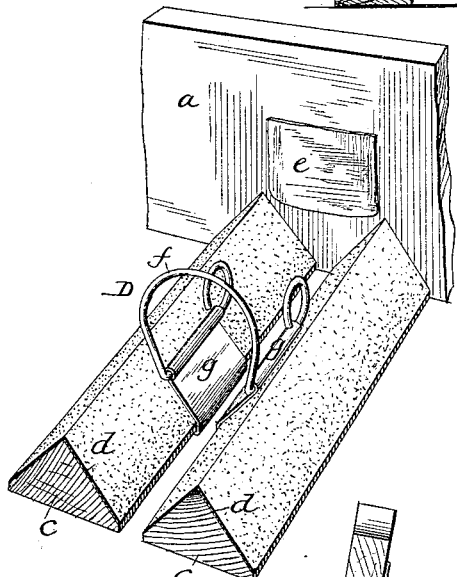
Figure 8:
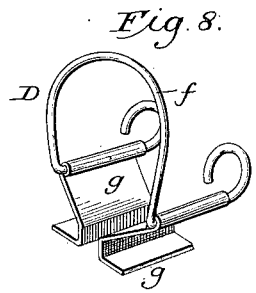
Figure 6:
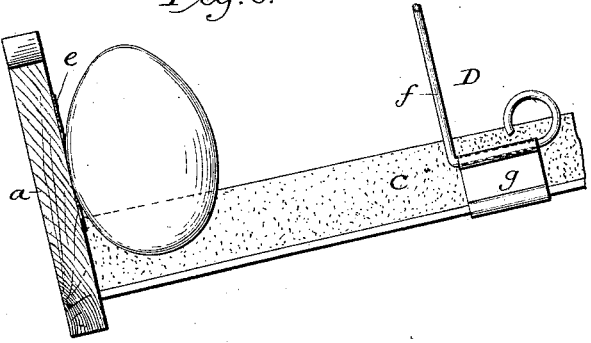
Figure 7:
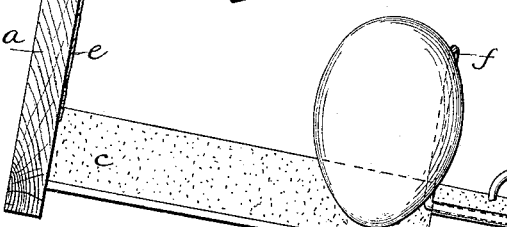

In the drawings, Figure 1 is a perspective view of my improved egg-preserver; Figs. 2 and 3, vertical sectional views showing the device in different positions; Fig. 4, a vertical cross-section on the line *x x* of Fig. 3; Fig. 5, an enlarged perspective view of a portion of one of the trays. Figs. 6 and 7 are views of the egg-holding trays in different positions, showing the manner in which the eggs reverse their position; and Fig. 8, a perspective view of the adjustable stop sometimes used in connection with the trays.

A indicates a flat base, to the under side of which are secured two curved rockers, B B, as shown in Figs. 1, 2, 3, and 4, the parts thus constructed being adapted to receive the egg trays or holders C.

The egg holders or trays C are preferably made in the form of a rectangular frame, comprising end pieces, *a a*, and side pieces, *b b*, the end pieces being of less height than the side pieces, so that when the trays or holders are placed one upon the other, as shown in Figs. 1 to 4, a space is afforded between the trays or holders, through which air may pass or circulate.

The bottoms of each of the trays C are formed of a series of bars, *c*, preferably of A shape in cross-section, placed side by side, as shown in Figs. 1, 4, and 5, and secured at each end to the end pieces, *a*. These bars or rods *c c* will advisably be roughened upon their upper faces in any suitable manner—as, for instance, by a layer, *d*, of emery-cloth or sand-paper, as shown in Fig. 5 of the drawings as applied to the bars.

I do not limit myself to the use of the particular devices or materials for roughening the surfaces of the bars, as it will be seen that this can be done in various other ways—as, for instance, by painting and sanding them. The material forming the bars may likewise be varied as desired, wood or metal being used, as found desirable.

It will be noticed that the upper face of each bar slopes in or inclines slightly downward from each end toward the center, as clearly shown in Figs. 1, 2, 3, 6, and 7, for a purpose presently explained.

Between the bars *c c* at each end the end pieces, *a a*, will preferably be provided with a cushion or pad, *e*, of felt, rubber, or other suitable material, against which the end egg of each row may strike, and thereby prevent the possibility of its being broken.

In some cases there may not be a sufficient number of eggs to complete the rows on the tray, and hence it will be found necessary to provide a stop, D, which shall limit the motion of the eggs and prevent their making more than one half-revolution or complete reversal. Such a stop is clearly shown in Figs. 5 and 8, and will be seen to consist of a loop, *f*, of spring-wire, having its ends bent horizontally and inserted into and carrying sheet-metal runners *g*, which latter engage with and are adapted to slide upon the opposing faces of the bars *c*. By pressing the ends of the loop *f* together the runners are released from the bars c, and the stop may be moved lengthwise upon the bars to any desired position. It is obvious that any equivalent form of stop—such, for instance, as one composed entirely of wire—may be used, provided, however, that it is capable of being adjusted.

As shown in Figs. 1, 2, 3, and 4, each of the trays or holders C is provided with clips or blocks h, (preferably four in number,) which engage over the tray next below, so that trays will be prevented from moving or slipping one upon another, the lowermost tray being thus secured to the base or support A. Such devices are well known, and it will be seen that any other suitable device may be employed for holding the trays in position upon the base A.

The operation of the device is as follows: Eggs are placed upon end—say, for instance, with their points up—on the bars c c, and as each tray or holder C is filled it is placed upon the rocker-frame. Now, as the apparatus is tipped or rocked to one side, the eggs will each turn over or reverse their position, end for end, making a half-revolution in the direction of their longest axis, as clearly illustrated in Figs. 6 and 7, the eggs then resting upon their points, and when the device is tipped or rocked in the reverse direction the eggs will make a half-revolution in the opposite direction and present their points upward again.

Owing to the roughness of the bars c c, the eggs are prevented from slipping upon the bars, and it will also be observed that by having the bars inclined or curved lengthwise from each end toward the middle the egg at the rear end of the series relatively to the direction of tipping will first begin to move, thereby pressing against the egg next before it, and so on throughout the series, thus keeping the eggs in contact with one another while tipping.

Ordinarily the device will be placed upon the floor of the compartment in which the preserving is done; but owing to the unevenness of some floors it will be found desirable to use a base, E, which may consist simply of a rectangular frame having flat bearing-faces upon which the rockers are adapted to rest.

In order to hold the device in either of its inclined positions, the rockers D may be provided with pivoted buttons i, which, when one end of the rocker is elevated, may be swung down so as to rest upon the floor. When not in use, the buttons will be thrown back up out of the way, and will rest upon a pin or stud on the rocker.

When the base E is used, the latter may be provided with curved arms j, which pass through loops k upon the rockers, the loops being provided with clamping-screws l, which may bear against the arms k, and thereby hold the rocker-frame at any desired angle.

It is obvious that instead of making the rockers with a continuous curved bearing-face, as shown in Figs. 1 and 2, they may be made, as represented in Fig. 3, with two straight faces, so that when tipped or rocked in either direction the device will remain in either of the positions in which it may be placed. It is also obvious that instead of using separate bars c c the bottom of the tray may be constructed of a grooved or channeled board, which I consider the equivalent of the bars.

It is obvious that a single tray may be used, or a series of trays, as circumstances require.

I am aware that it is not new to construct egg-preserving cabinets and incubators with tipping trays having parallel bars, slats, or ribs at such distance apart as to support eggs in a horizontal position, so that upon tipping the tray the eggs shall roll sidewise about their longitudinal axes, and this I do not claim. I am not aware, however, that any one has ever before devised a tray or support designed or adapted to support eggs on end and to cause them to roll lengthwise, end over end, upon such support when tipped, and thereby to reverse their positions. This mode of reversing the eggs end for end by rolling them lengthwise is simple, cheap, and expeditious, and is advantageous over prior methods in that it requires only the momentary exercise of slight force to tip the trays or the case containing them, and thus to reverse every egg contained therein; and, further, in that the rolling or plunging movement and somewhat sudden stoppage, while not sufficiently violent to break the eggs, is sufficient to cause a movement of the yelk, and thus to insure its dislodgment if lying close to the shell. A tray adapted to hold eggs in a horizontal position is not suitable for nor is it capable of holding them in a vertical position and rolling them end over end, because if separated a distance sufficient to properly support an egg on its side the supporting-bars must inevitably be so far apart as to permit the egg, when placed point down, to fall so far between the bars as to materially interfere with, if not prevent, its turning, because in such position the point of the egg will interfere with or be interfered with by eggs in the tray below, if the trays are open and placed one above another; and because, finally, if the bars be applied to or provided with a closed bottom, the eggs will bear at their ends upon said bottom and fall sidewise in any and all directions at random. It is essential, therefore, that the bars be placed at such distance apart as to support the eggs in an upright position and prevent them from falling over transversely to the bars.

The holder provided with curved rockers is not specifically claimed herein, but is made the basis of a separate application, including also the cushion for the eggs to fall against, the present application being designed to cover the broad idea of rolling eggs-end over end upon their support and a tray or holder adapted to produce that result. While therefore disclaiming the sidewise rolling of eggs, a tipping tray adapted to support and roll eggs upon their sides, or the inversion of an egg crate or case.

What I claim is—

1. In an apparatus for preserving eggs, a tray or holder, one or more, provided with ribs or bars placed at such distance one from another as to support eggs in an upright position, and pivoted, substantially as set forth, whereby the eggs may be caused to roll end over end and reverse their positions when the tray is tipped.

2. In an egg-preserving apparatus, a pivoted or tipping tray provided with parallel ribs or bars placed at such distance apart as to support eggs on end, and having the supporting-faces of the ribs or bars roughened to prevent the eggs from slipping thereon, substantially as set forth.

3. In a device for preserving eggs, a tray or holder, C, comprising a frame and a grooved or channeled support for the eggs, the upper surface of the latter being curved or inclined lengthwise from each end toward the middle, substantially as and for the purpose specified.

4. In a device for preserving eggs, a tray, C, provided with an adjustable stop, D, as and for the purpose set forth.

5. In combination with tray C, comprising frame $a\ b$ and bars $c$, the stop D, consisting of the spring-loop $f$ and runners $g$, carried by the lower ends of the loop.

In witness whereof I hereunto set my hand in the presence of two witnesses.

WILLIAM N. CANDEE.

Witnesses:
WILLIAM W. DODGE,
WALTER S. DODGE.